United States Patent
Lipton et al.

(10) Patent No.: US 9,158,975 B2
(45) Date of Patent: Oct. 13, 2015

(54) VIDEO ANALYTICS FOR RETAIL BUSINESS PROCESS MONITORING

(75) Inventors: Alan J. Lipton, Herndon, VA (US);
Peter L. Venetianer, McLean, VA (US);
Niels Haering, Reston, VA (US); Paul C. Brewer, Arlington, VA (US);
Weihong Yin, Herndon, VA (US);
Zhong Zhang, Herndon, VA (US); Li Yu, Herndon, VA (US); Yongtong Hu, Herndon, VA (US); Gary W. Myers, Aldie, VA (US); Andrew J. Chosak, Arlington, VA (US); Robert A. Cutting, Ashburn, VA (US); W. Andrew Scanlon, Fairfax, VA (US)

(73) Assignee: Avigilon Fortress Corporation, Vancouver (CA)

(*) Notice: Subject to any disclaimer, the term of this patent is extended or adjusted under 35 U.S.C. 154(b) by 1221 days.

(21) Appl. No.: 11/826,324

(22) Filed: Jul. 13, 2007

(65) Prior Publication Data
US 2008/0018738 A1 Jan. 24, 2008

Related U.S. Application Data

(60) Provisional application No. 60/830,667, filed on Jul. 14, 2006.

(51) Int. Cl.
*H04N 7/18* (2006.01)
*G06K 9/00* (2006.01)
(Continued)

(52) U.S. Cl.
CPC ........ *G06K 9/00771* (2013.01); *G08B 13/1968* (2013.01); *G08B 13/19608* (2013.01);
(Continued)

(58) Field of Classification Search
CPC .......... G06K 9/00771; G06K 9/00369; G06K 9/00711; G06K 9/34; G06K 9/38; G06T 2207/10016; G06T 2207/20144; G06T 7/20; G06T 2207/30232; G06T 7/2033; G06F 17/3079; G06B 13/19608; G06B 13/19613; G06B 13/19652; G06B 13/1968
USPC .................................................. 348/143, 150
See application file for complete search history.

(56) References Cited

U.S. PATENT DOCUMENTS

| 5,097,328 A | 3/1992 | Boyette |
| 5,965,861 A | 10/1999 | Addy et al. |

(Continued)

FOREIGN PATENT DOCUMENTS

| WO | PCT/US2006/045068 | 11/2006 |
| WO | WO 2007/062044 A2 | 5/2007 |

OTHER PUBLICATIONS

U.S. Appl. No. 11/139,986, May 31, 2005, Zhang et al.
(Continued)

*Primary Examiner* — Oleg Survillo
(74) *Attorney, Agent, or Firm* — MH2 Technology Law Group, LLP

(57) ABSTRACT

A system for video monitoring a retail business process includes a video analytics engine to process video obtained by a video camera and generate video primitives regarding the video, A user interface is used to define at least one activity of interest regarding an area being viewed, each activity of interest identifying at least one of a rule or a query regarding the area being viewed. An activity inference engine processes the generated video primitives based on each defined activity of interest to determine if an activity of interest occurred in the video.

17 Claims, 16 Drawing Sheets

(51) Int. Cl.
   *G08B 13/196* (2006.01)
   *G06T 7/20* (2006.01)
   *G06K 9/34* (2006.01)
   *G06K 9/38* (2006.01)
   *G06F 17/30* (2006.01)

(52) U.S. Cl.
   CPC .... *G08B13/19613* (2013.01); *G08B 13/19652* (2013.01); *G06F 17/3079* (2013.01); *G06K 9/00369* (2013.01); *G06K 9/00711* (2013.01); *G06K 9/34* (2013.01); *G06K 9/38* (2013.01); *G06T 7/20* (2013.01); *G06T 7/2033* (2013.01); *G06T 2207/10016* (2013.01); *G06T 2207/20144* (2013.01); *G06T 2207/30232* (2013.01)

(56) References Cited

U.S. PATENT DOCUMENTS

| | | | |
|---|---|---|---|
| 6,236,736 B1 | 5/2001 | Crabtree et al. | |
| 6,301,386 B1 * | 10/2001 | Zhu et al. | 382/176 |
| 6,421,459 B1 * | 7/2002 | Rowe | 382/154 |
| 6,625,310 B2 | 9/2003 | Lipton et al. | |
| 6,696,945 B1 | 2/2004 | Venetianer et al. | |
| 6,970,083 B2 | 11/2005 | Venetianer et al. | |
| 6,987,883 B2 | 1/2006 | Lipton et al. | |
| 2002/0051491 A1 * | 5/2002 | Challapali et al. | 375/240.2 |
| 2003/0053659 A1 * | 3/2003 | Pavlidis et al. | 382/103 |
| 2003/0107650 A1 | 6/2003 | Colmenarez et al. | |
| 2004/0080615 A1 * | 4/2004 | Klein et al. | 348/143 |
| 2004/0145471 A1 * | 7/2004 | Lawrenson et al. | 340/539.21 |
| 2004/0151374 A1 | 8/2004 | Lipton et al. | |
| 2005/0146605 A1 | 7/2005 | Lipton et al. | |
| 2005/0162515 A1 | 7/2005 | Venetianer et al. | |
| 2005/0168574 A1 | 8/2005 | Lipton et al. | |
| 2005/0169367 A1 | 8/2005 | Venetianer et al. | |
| 2006/0066719 A1 | 3/2006 | Haering et al. | |
| 2006/0066722 A1 | 3/2006 | Yin et al. | |
| 2006/0072010 A1 | 4/2006 | Haering et al. | |
| 2006/0074546 A1 * | 4/2006 | DeKock et al. | 701/117 |
| 2006/0222209 A1 | 10/2006 | Zhang et al. | |
| 2006/0239506 A1 | 10/2006 | Zhang et al. | |
| 2006/0262958 A1 | 11/2006 | Yin et al. | |
| 2006/0268111 A1 | 11/2006 | Zhang et al. | |
| 2006/0284978 A1 * | 12/2006 | Girgensohn et al. | 348/143 |
| 2006/0291694 A1 | 12/2006 | Venetianer et al. | |
| 2006/0291695 A1 | 12/2006 | Lipton et al. | |
| 2007/0013776 A1 | 1/2007 | Venetianer et al. | |
| 2007/0058040 A1 | 3/2007 | Zhang et al. | |
| 2007/0182818 A1 * | 8/2007 | Buehler | 348/143 |
| 2007/0279214 A1 * | 12/2007 | Buehler | 340/521 |
| 2010/0214448 A1 * | 8/2010 | Ouzilevski et al. | 348/231.99 |

OTHER PUBLICATIONS

U.S. Appl. No. 11/300,581, Dec. 15, 2005, Venetianer et al.
U.S. Appl. No. 11/288,200, Nov. 29, 2005, Venetianer et al.
U.S. Appl. No. 60/803,191, May 25, 2006, Lipton et al.

\* cited by examiner

VIDEO ANALYTICS FOR RETAIL BUSINESS PROCESS MONITORING

The present application claims priority to and the benefit of U.S. Provisional Application No. 60/830,667 entitled "Video analytics for retail business process monitoring" filed Jul. 14, 2006.

CROSS-REFERENCE TO RELATED PATENTS AND PATENT PUBLICATIONS

The following patents and publications, the subject matter of each is being incorporated herein by reference in its entirety, are mentioned:

U.S. Pat. No. 6,987,883, issued Jan. 17, 2006, entitled "Video Scene Background Maintenance Using Statistical Pixel Modeling," by Lipton et al.;

U.S. Pat. No. 6,970,083, issued Nov. 29, 2005, entitled "Video Tripwire," by Venetianer et al.;

U.S. Pat. No. 6,696,945, issued Feb. 24, 2004, entitled "Video Tripwire," by Venetianer et al.;

U.S. Pat. No. 6,625,310, issued Sep. 23, 2003, entitled "Video Segmentation Using Statistical Pixel Modeling," by Lipton et al.;

U.S. Published Patent Application No. 2007/0058040, published Mar. 15, 2007, entitled "Video Surveillance Using Spatial-Temporal Motion Analysis," by Zhang et al.;

U.S. Published Patent Application No. 2007/0013776, published Jan. 18, 2007, "Video Surveillance System Employing Video Primitives," by Venetianer et al.;

U.S. Published Patent Application No. 2006/0291695, published Dec. 28, 2006, entitled "Target Detection and Tracking from Overhead Video Streams," by Lipton et al.;

U.S. Published Patent Application No. 2006/0291694, published Dec. 28, 2006, entitled "Detection of Change in Posture in Video," by Venetianer et al.;

U.S. Published Patent Application No. 2006/0268111, published Nov. 30, 2006, entitled "Multi-State Target Tracking," by Zhang et al.;

U.S. Published Patent Application No. 2006/0262958, published Nov. 23, 2006, entitled "Periodic Motion Detection with Applications to Multi-Grabbing," by Yin et al.;

U.S. Published Patent Application No. 2006/0239506, published Oct. 26, 2006, entitled "Line Textured Target Detection and Tracking with Applications to 'Basket-Run' Detection," by Zhang et al.;

U.S. Published Patent Application No. 2006/0222209, published Oct. 5, 2006, entitled "Wide-Area Site-Based Video Surveillance System," by Zhang et al.;

U.S. Published Patent Application No. 2006/0072010, published Apr. 6, 2006, entitled "Target Property Maps for Surveillance Systems," by Haering et al.;

U.S. Published Patent Application No. 2006/0066722, published Mar. 30, 2006, entitled "View Handling in Video Surveillance Systems," by Yin et al.;

U.S. Published Patent Application No. 2006/0066719, published Mar. 30, 2006, entitled "Method of Finding Paths in Video," by Haering et al.;

U.S. Published Patent Application No. 2005/0169367, published Aug. 4, 2005, entitled "Video Surveillance System Employing Video Primitives," by Venetianer et al.;

U.S. Published Patent Application No. 2005/0168574, published Aug. 4, 2005, entitled "Video-Based Passback Event Detection," by Lipton et al.;

U.S. Published Patent Application No. 2005/0162515, published Jul. 28, 2005, entitled "Video Surveillance System," by Venetianer et al.;

U.S. Published Patent Application No. 2005/0146605, published Jul. 7, 2005, entitled "Video Surveillance System Employing Video Primitives," by Lipton et al.;

U.S. Published Patent Application No. 2004/0151374, published Aug. 5, 2004, entitled "Video Segmentation Using Statistical Pixel Modeling," by Lipton et al.;

U.S. patent application Ser. No. 11/300,581, filed Dec. 15, 2005, entitled "Video Surveillance System Employing Video Primitives," by Venetianer et al.

U.S. patent application Ser. No. 11/139,986, filed May 31, 2005, entitled "Human Detection and Tracking for Security Applications," by Zhang et al.;

U.S. patent application Ser. No. 11/300,581, filed Dec. 15, 2005, "Video Surveillance System Employing Video Primitives," by Venetianer et al.;

U.S. patent application Ser. No. 11/288,200, filed Nov. 29, 2005, entitled "Detection of Stationary Objects in Video," by Venetianer et al.;

PCT Patent Application No. PCT/US2006/045068, filed Nov. 23, 2006, entitled "Object Density Estimation in Video," by Liu et al.;

U.S. Provisional Patent Application No. 60/803,191, filed May 25, 2006, entitled "Intelligent Video Verification of Point of Sale (POS) Transactions," by Lipton et al.

FIELD OF THE INVENTION

The present invention relates to the field of video analytics as applied to the monitoring of retail business processes.

BACKGROUND

Conventional techniques for monitoring retail business processes, for example, involve analysis of sensor data, such as, people counting device data, or point of sale (POS) system data. Other conventional techniques involve analysis of data collected by human observers who, typically, move around and manually record information relevant to monitoring retail business processes. In other implementations retail business monitoring video cameras which observe the business process are monitored by remote human observers to extract business intelligence data.

Many retail businesses conventionally employ closed-circuit television (CCTV) cameras on the premises. The video from the CCTV cameras are observed by one or more humans and/or recorded for later observation by one or more humans. The CCTV cameras typically monitor store floors, POS terminals, store rooms, parking lots, distribution centers, warehouses, and/or private office spaces. However, to monitor or review the video provided by all available CCTV cameras might require a substantial number of humans and a substantial expense. As such, placing CCTV cameras in all desirable locations of a retail business and contemporaneously or non-contemporaneously monitoring all the video from the CCTV cameras is not practical.

SUMMARY

One embodiment of the invention includes a system for video monitoring a retail business process comprising: a video analytics engine to process video obtained by a video camera and to generate video primitives regarding the video; a user interface to define at least one activity of interest regarding an area being viewed, wherein each activity of interest identifies at least one of a rule or a query regarding the area being viewed; and an activity inference engine to process the generated video primitives based on each defined activity of interest and to determine if an activity of interest occurred in the video.

One embodiment of the invention includes a method for video monitoring a retail business process comprising: obtaining video from a video camera; processing the video obtained from the video camera; generating video primitives regarding the video; defining at least one activity of interest regarding an area being viewed, wherein each activity of interest identifies at least one of a rule or a query regarding the area being viewed; and processing the generated video primitives based on each defined activity of interest to determine if an activity of interest occurred in the video.

One embodiment of the invention includes a computer-readable medium comprising software for video monitoring a retail business process, which software, when executed by a computer system, causes the computer system to perform operations comprising a method of: processing video obtained by a video camera; generating video primitives regarding the video; defining at least one activity of interest regarding an area being viewed, wherein each activity of interest identifies at least one of a rule or a query regarding the area being viewed; and processing the generated video primitives based on each defined activity of interest to determine if an activity of interest occurred in the video.

One embodiment of the invention includes an apparatus for video monitoring a retail business process comprising: a video camera to obtain video of an area; a video analytics engine to process the obtained video and generate video primitives regarding the video; and an activity inference engine to process the generated video primitives based on at least one activity of interest regarding the area being viewed to determine if an activity of interest occurred in the video, wherein each activity of interest defines at least one of a rule or a query selectively identified by a user regarding the area being viewed.

BRIEF DESCRIPTION OF THE DRAWINGS

The foregoing and other features of various embodiments of the invention will be apparent from the following, more particular description of such embodiments of the invention, as illustrated in the accompanying drawings, wherein like reference numbers generally indicate identical, functionally similar, and/or structurally similar elements.

FIGS. 2A to 2K illustrate images from monitoring exemplary retail business processes using an exemplary embodiment of the invention.

DEFINITIONS

Figure 1:
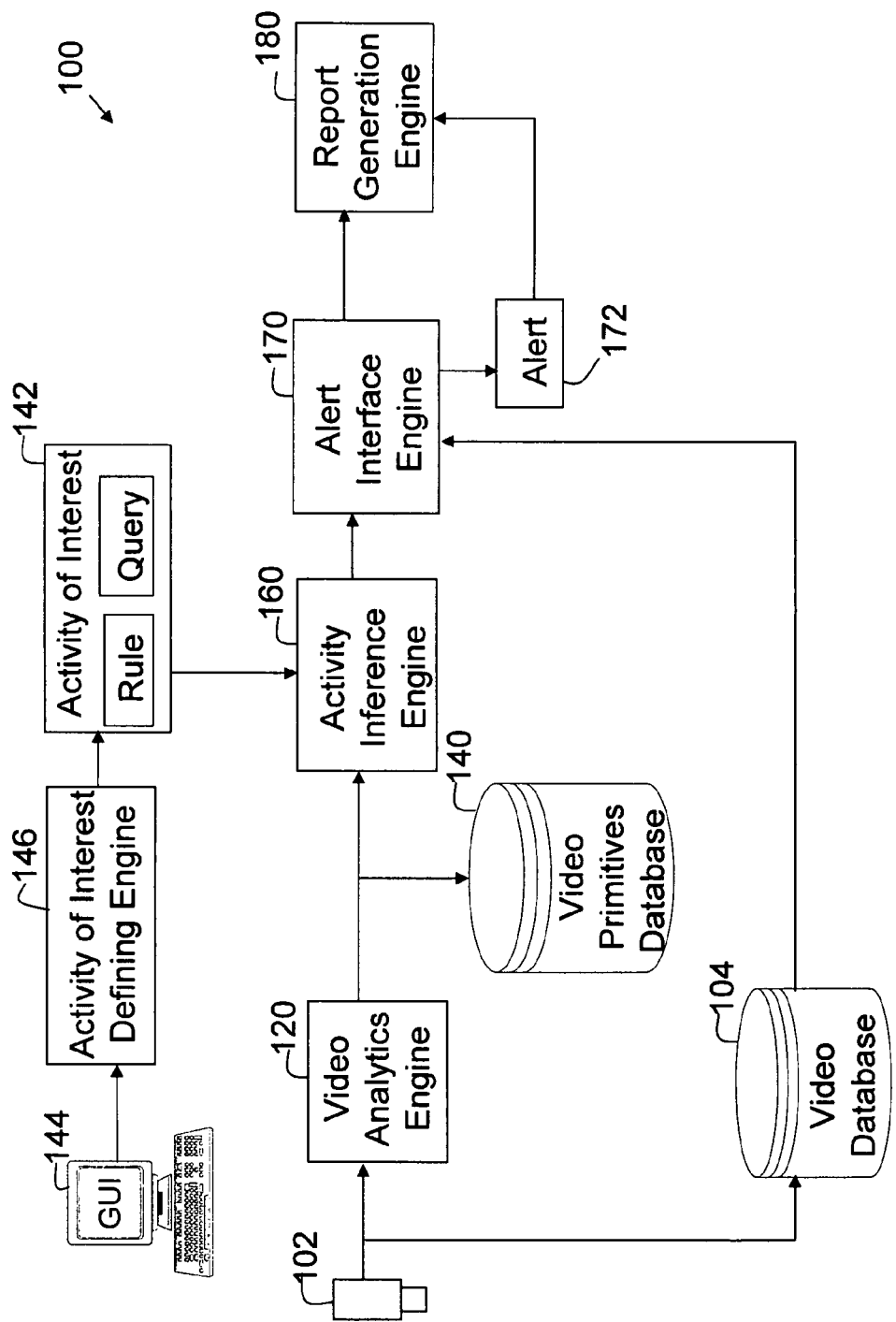
FIG. 1 illustrates an exemplary embodiment of the invention.

The following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a general purpose processor (GPP), a digital signal processor (DSP), an application-specific integrated circuit (ASIC), an application specific instruction-set processor (ASIP), a field-programmable gate array (FPGA), a chip, chips, or a chip set or a multiprocessor system-on-chip (MPSoC); a distributed computer system for processing information via computer systems linked by a network; an optical computer; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer readable medium" may refer to any storage device used for storing data accessible by a computer. Examples of a computer-readable medium include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

A "motion block" refers to a video block in which there are at least some predetermined number of foreground pixels present.

DETAILED DESCRIPTION OF EXEMPLARY EMBODIMENTS

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

The invention involves the use of an automated video surveillance system employing video analytics for monitoring retail business processes. Video analytics may refer to the application of computer vision techniques to extract useful data or information from video streams or video sequences. Specifically, the invention may be applied to the retail business processes involving physical security, public safety, loss prevention, and business intelligence data gathering, including marketing and employee effectiveness.

Examples of applying the invention to retail business processes involving physical security may include, for example, detection of: an intrusion within a retail facility; an act of vandalism within or around a retail facility; unauthorized access to a secure area (known as "tailgating"); and suspicious behavior around cars in a parking lot.

Examples of applying the invention to retail business processes involving public safety may include, for example, detection of: people slipping and falling on store property; a dangerous liquid spill or obstruction on a store floor; people running in a store or a parking lot; an assault or abduction in a store parking lot; a car speeding in a parking lot; an obstruction of a fire exit; and crowding in a store area or outside of the store.

Examples of applying the invention to retail business processes involving loss prevention may include, for example, detection of: "clearing out" shelf space; a basket of merchandise leaving a store without the shopper(s) paying; a person (e.g., employee(s)) moving merchandise out of the store through an irregular channel; an unscheduled delivery in a loading dock area; an unscheduled and/or unauthorized activity in a store area (e.g., behind a counter, in a pharmacy, in a store room, or in a warehouse); a person(s) reaching into a cash register drawer; an employee not checking out item(s) for a customer (i.e., sweethearting); merchandise left in/on bottom of a shopping basket or cart and not scanned; and POS system integration.

Examples of applying the invention to retail business processes involving business intelligence data gathering may include, for example: tracking of people through store areas to determine, for example, how many people go through, where they dwell, how long they dwell, how their shopping habits compare to their purchasing habits (by employing, for example, POS data), and the behavior of a "shopping unit"; queue length monitoring; monitoring of store cleanliness; monitoring of an unattended delivery; measuring employee effectiveness through object tracking and POS data; measuring customer service process through people tracking by monitoring employee-customer interactions; and measuring store layout effectiveness through people tracking and marketing and/or conversion data.

The exemplary automated video surveillance system of the invention may employ low-level video analytics algorithms to process the video feeds to extract all of the objects of interest, whilst ignoring any irrelevant background motion. These objects of interest may be described via a set of "video primitives," which may be a text description of all of the objects and observable features within a video. These video primitives also may include descriptions of the objects, their locations, velocities, shape, colors, location of body parts, etc.

The exemplary automated video surveillance system of the invention may combine information and video primitives from multiple cameras. This can enable applications like cross-camera tracking of targets. Data from multiple cameras can be combined and all applications listed above applied to the combined information. This way the shopping habit of customers may be analyzed in more details than just relying on a single camera.

The video primitives may be analyzed in a real-time mode via an activity inference engine to determine if an activity of interest has occurred and/or stored in a database for such further analysis. These activities may be presented as "alerts" to a user or gathered together to generate a report for a user.

In addition to, or instead of, this real-time mode, the system may also operate in an off-line mode (e.g., forensic mode) wherein queries may be applied to archived video primitives after the fact. In the off-line mode, the user may look for activities by mining the video primitives, instead of performing the entire video analytics again.

The exemplary automated video surveillance system of the invention may be implemented, for example, as described in the following patent publications, identified above:

U.S. Published Patent Application No. 2005/0146605,
U.S. Published Patent Application No. 2005/0162515,
U.S. Published Patent Application No. 2005/0169367,
U.S. Published Patent Application No. 2007/0013776, and
U.S. patent application Ser. No. 11/300,581.

FIG. 1 illustrates an exemplary automated video surveillance system 100. A video camera 102 may be positioned to view an area of a retail enterprise to obtain video data. Optionally, the video data from the video camera 102 may be stored in a video database 104. The video data from the video camera 102 may be processed by a video analytics engine 120 to produce video primitives. The video primitives may be stored in a video primitive database 140. A user may define an activity or activities of interest 142 via a user interface 144 and an activity of interest defining engine 146. For example, the activity of interest 142 may be defined as a rule 148 or a query 150 regarding the area viewed by the video camera 102. An activity inference engine 160 may process the video primitives based on the defined activities of interest 142 to determine if any of the activities 142 occurred in the obtained video. An alert interface engine 170 may generate an alert 172 if an activity of interest is determined to have occurred. The alert 172 may include video primitive data and/or associated video imagery stored in the video database 104. The alert 172 may trigger a response. For example, a report generation engine 180 may generate a report for the alerts.

In terms of the architecture of the exemplary automated video surveillance system 100, a number of different embodiments may be used as described, for example, in U.S. Published Patent Application No. 2006/0291694, identified above. In one embodiment, the video analytics engine 120 and the activity inference engine 160 may be embodied within a single device, e.g., a computer, a chip, chips, or a chip set. The single device may be resident within the video camera 102, an encoder, a router, a digital video recorder (DVR), a network video encoder (NVR) or some other network video device. In another embodiment, the video analytics engine 120 and the activity inference engine 160 may be embodied within separate devices. For example, the video analytics engine 120 may be embodied within a first device, which may be a computer, a chip, chips, or a chip set and may be embodied within the video camera 102, an encoder, a router, a digital video recorder (DVR), a network video encoder (NVR) or some other network video device. The activity inference engine 160 may be embodied within a second device which may be a computer, a chip, chips, or a chip set and may be embodied within an encoder, a router, a digital video recorder (DVR), a network video encoder (NVR) or some other network video device connected to the first device via a network. In this embodiment, the video primitives may be sent across the network.

The video analytics engine 120 may process the video data from the video camera 102 in real-time and produce video primitives. Examples of the algorithms that may be employed by the video analytics engine 120 are described in the following patents and patent publications, identified above:

U.S. Pat. No. 6,625,310,
U.S. Pat. No. 6,696,945,
U.S. Published Patent Application No. 2005/0146605,
U.S. Pat. No. 6,987,883,
U.S. Published Patent Application No. 2005/0168574,
U.S. Published Patent Application No. 2004/0151374,
U.S. Pat. No. 6,970,083,
U.S. Published Patent Application No. 2006/0066722,
U.S. Published Patent Application No. 2006/0066719,
U.S. Published Patent Application No. 2006/0072010,
U.S. Published Patent Application No. 2005/0162515,
U.S. Published Patent Application No. 2005/0169367,
U.S. Published Patent Application No. 2006/0239506,
U.S. Published Patent Application No. 2006/0262958,
U.S. Published Patent Application No. 2006/0268111,
U.S. patent application Ser. No. 11/139,986,
U.S. Published Patent Application No. 2007/0013776,
U.S. Published Patent Application No. 2006/0291694,
U.S. Published Patent Application No. 2006/0291695,
U.S. Published Patent Application No. 2007/0058040,
U.S. patent application Ser. No. 11/288,200,
U.S. patent application Ser. No. 11/300,581, and
PCT Patent Application No. PCT/US2006/045068.

For example, the video analytics engine 120 may detect objects of interest; classify objects in classes such as human, vehicle, or other; track objects through a scene; determine if an object is inserted into a scene or removed from a scene; detect an object moving against a flow of traffic; determine the "normal" size, shape, or speed of an object in an area; determine the "normal" path of an object through an area; determine if a person pushing a shopping cart exits a store without paying; determine the number of times a person reaches a hand into an area; determine if a person has slipped and fallen; and determine the density of a crowd in a scene.

The video analytics engine 120 may generate video primitives. The video primitives may be categorized in different categories, such as, for example time video primitives; blob video primitives; target video primitives; environmental video primitives; flow-control video primitives; and special purpose video primitives for retail business processes.

Each type or category of video primitive may contain generic primitive data. Generic primitive data may be generic identification information. The following exemplary generic primitive data may include the following exemplary generic identification information:

Primitive identifier: A globally unique identifier (GUID) for each primitive.

Video time: A timestamp of video frame to which primitive corresponds.

Sensor identifier: A GUID for the video camera that generated the video.

View identifier: A GUID for which view the system is in, which may be useful when a video camera is operating in multi-view mode (such as a PTZ camera on a guard tour).

Time video primitives may be generated periodically to provide a heartbeat to the system, even if nothing is happening in the video. Hence, no other video primitives are sent. The time video primitives may include only generic primitive data.

Blob video primitives may be generated when a blob is detected. A blob may refer to a single frame instance of a spatially continuous moving target. Blob video primitives may include generic primitive data and blob primitive data. The blob primitive data may be spatial descriptors. The following exemplary blob primitive data may include the following exemplary information:

Area: Number of pixels comprising the blob.

Perimeter: Number of pixels comprising a boundary of the blob.

Bounding box: (x,y) coordinates of top-left and bottom-right of a blob bounding box.

Centroid: (x,y) coordinates of a blob centroid.

Foot location: (x,y) coordinates of a location of a bottom of the object, e.g., the feet of a human, the wheels of a vehicle or a shopping cart, etc.

Number of objects/humans: A number of individual human objects detected in the blob.

Human head locations: (x,y) location of heads and the radius of the heads detected in the blob.

Color properties: histogram of blob colors and shades, e.g., 10 bins (7 colors, 3 shades) in HSV color space.

Shape: Bitmask of an object shape.

Skin-tone: Proportion and bitmask of pixels with skin-tone coloration.

Blob imagery: Image of the blob.

Target video primitives may describe a snapshot of a moving target and may include generic primitive data and target primitive data. A target may refer to a complete description of a target over time, e.g., a sequence of blobs. The following exemplary target primitive data may include the following exemplary information:

Target identifier: A GUID for each target.

Target age: Time since target was first seen.

Instantaneous velocity: Velocity of target at a given time.

Classification: Histogram of classifications: human, vehicle, etc.

Stationary properties: Insertion, removal, or moving; or active or passive stationary target.

Salience properties: Whether the target is moving in a salient, purposeful way.

Target inheritance properties: Describing targets splitting and merging.

Target occlusion status: Occluded, appearing, disappearing, fully visible.

Temporal position: A temporal positioning of the video primitive such as the first, the last, or in the middle of the target.

Frame-specific blob primitive data for the target.

Environmental video primitives may describe an environmental change and may include generic primitive data and environmental primitive data. The following exemplary environmental primitive data may include the following exemplary information:

Type of environmental change: lights on/off, camera moved.

Start and end time of change.

Flow-control video primitives may describe the detected motion for the flow within the video and may include generic primitive data and flow-control primitive data. For flow-control video primitives, the scene may be decomposed into a series of grid elements. The flow may be computed in each one. The following exemplary flow-control primitive data may include the following exemplary information:

Location of the grid element: (x,y) coordinate of a grid element.

Motion vector of the grid element: (x,y) motion vector at that element.

Special purpose video primitives for retail business processes may be generated for special applications or debugging. Examples of special purpose video primitives include a basket run video primitive; a high-value item stealing video primitive; an omni-directional video primitive; and a motion histogram video primitive.

A basket run video primitive may indicate the start and end point of detected line segments. The basket run video primitive may be used for detection of a retail basket run, where a basket full of merchandise goes through the front door of a store without payment.

A high-value item stealing video primitive may indicate the position and direction, e.g., up and/or down, of motion blocks. The high-value item video primitive may be used for detection of someone "cleaning out" a retail shelf, for example, by counting a number of times a customer has reached into a shelf.

An omni-directional video primitive may indicate warped image dimensions. The omni-directional video primitive may be used for determining location and orientation of objects in an omni-directional image view.

A motion histogram video primitive may indicate a motion histogram for the entire image. The motion histogram video primitive may be used for various anomaly detection rules.

The activity inference engine 160 may be embodied as a query engine that may analyze the video primitives based on one or more defined rules 148 or queries 150 and determine activities of interest. The activity inference engine 160 may operate in real-time and process the video primitives immediately when the video primitives are generated by the video analytics engine 120. Alternatively, the activity inference engine 160 may operate off-line and process the video primitives stored in the video primitive, database 140. The off-line mode allows the user to search for events after the fact, without reprocessing the video.

The query language of the activity inference engine 160 is described, for example, in U.S. Published Patent Application No. 2005/0162515, identified above. The rules 148 or queries 150 may include rule elements and combinators.

Rule elements may detect properties and behaviors of targets. The following are exemplary rule elements, along with examples:

Tripwire crossing: Did the target cross tripwire in a prescribed direction?

Area/region of interest rules: Did the target enter, exit, appear, disappear, inside, loiter in a prescribed area?

Classification type: Is the target a human, a vehicle, etc.?

Stationary mode: Is the target in a state of an insertion, removal, or moving? How long has the target been in this state?

Size: Bigger than, smaller than, size changed more/less than.

Speed: Faster than, slower than.

Color: Does the target include/exclude the prescribed color(s)?

Salience: Is the target moving in a salient (purposeful) fashion?

Time: Is current time in a prescribed time window? Is the time a recurring or repetitive pattern?

Change in speed: Did the speed of the target suddenly change in a prescribed way: speed up, slow down or either?

Change in direction: Did the direction of motion of the target suddenly change?

Environmental: Did a prescribed type of environmental change such as lights on/off or camera motion occur?

Passback for an area of interest (AOI): Did something move in an illegal direction?

Slip and fall: Did a target fall or get up?

Basket run in an AOI: Did a shopping cart move in an illegal direction?

Multiple grab in an AOI: Did a person reach a prescribed number of times into an area?

Target counter in an AOI: Count number of targets in AOI and report if more than threshold/less than threshold/changes over threshold.

Dwell time in AOI: Measure the time targets spend in an AOI, and report the time. Reporting can happen for all targets, only for targets dwelling at least a predefined amount of time. It may also relate to multiple targets, e.g. detect only if a predefined number of targets dwell at least predefined amount of time in the AOI.

General anomaly: Is anything unusual, very different from the normal behavior? Unusual size, speed, path, and/or direction?

Unusual property: Is a particular target property unusual? Too big, too small, too fast, too slow, and/or wrong color?

Combinators may combine rules and/or other combinators as parameters (known as sub-events). An event occurs if the combination succeeds. The following are exemplary combinators, along with examples:

And: All sub-events succeed at the same time.

Or: At least one of the sub-events succeeds.

And Combinator: All sub-events succeeded, fulfilling user-defined spatial, temporal and/or target relationships between them. An example of And Combinator may include: A vehicle parked and within 30 sec (temporal relationship) a person appeared near it (spatial relationship). Another example of And Combinator may include: A person crossed a tripwire and more than 30 sec later (temporal relationship) the same person (target relationship) crossed another tripwire.

Match: Two sub-events succeed within a certain amount of time in a given order, e.g., a card is swiped and within 20 sec a person enters the door. The result of the match combinator may be: the two sub-events succeeded, e.g., normal behavior; the first sub-event happened without the second sub-event; the first sub-event happened twice without the second sub-event; or the second sub-event happened without the first sub-event, e.g., someone entered without a card swipe.

In one embodiment, the exemplary automated video surveillance system 100 may track individuals and shopping units across multiple video cameras. Shopping and shoplifting behavior of individuals around an entire store may be detected as targets may be tracked from one camera to another. The tracking of the targets using multiple video cameras is described, for example, in U.S. Published Patent Application No. 2006/0222209, identified above.

In the exemplary embodiments of the invention, retail business processes may be monitored by using the user-defined rules 148 in conjunction with the video primitives generated by the video analytics engine 120. The following is a list of exemplary retail business processes that may be monitored and exemplary rules that may be generated to monitor the retail business processes.

Examples of exemplary retail business processes involving physical security that may be monitored by using exemplary rules may include:

Intrusion detection within a retail facility: Person crosses security perimeter, e.g., tripwire, after normal hours. Exemplary rules are discussed, for example, in U.S. Pat. No. 6,696,945, and U.S. Pat. No. 6,970,083, identified above.

Detection of act of vandalism within or around a retail facility: Object, e.g., poster or graffiti, is inserted onto a wall area.

Detection of unauthorized access to a secure area, e.g., known as tailgating: Two people enter doorway area with only one access control event.

Detection of suspicious behavior around cars in a parking lot: Person visits multiple cars in a parking lot and lingers around each car for a period of time.

Examples of exemplary retail business processes involving public safety that may be monitored by using exemplary rules may include:

Detection of people slipping and falling on store property. Slipping and falling exemplary rules are discussed, for example, in U.S. Published Patent Application No. 2006/0291694, identified above.

Detection of a dangerous liquid spill or obstruction on a store floor: Object or liquid is inserted on the floor area.

Detection of people running in a store or a parking lot: Person is moving at speed faster than normal in the monitored area. Exemplary applicable rules are discussed, for example, in U.S. Published Patent Application No. 2006/0072010, identified above.

Detection of an assault or abduction in a store parking lot: Two people come together from different directions and one runs away afterward; one person runs towards another, the two persons leave in different directions.

Detection of a car speeding in a parking lot: Car is moving at a speed faster than normal in the monitored area. Exemplary applicable rules are discussed, for example, in U.S. Published Patent Application No. 2006/0072010, identified above.

Detection of an obstruction of a fire exit: Object is inserted in the fire door area.

Detection of crowding in a store area or outside of the store: High density crowd appears for longer than "x" minutes in the monitored area. Exemplary applicable rules are discussed, for example, in PCT Patent Application No. PCT/US2006/045068, identified above.

Exemplary retail business processes involving loss prevention that may be monitored by using exemplary rules may include:

Detection of clearing out shelf space: Person grabs more than "x" items from a shelf. Exemplary applicable rules are discussed, for example, in U.S. Published Patent Application No. 2006/0262958, identified above. For example, an embodiment of the invention may be directed to a "multi-grabbing" detection algorithm comprising performing motion/change detection of an input surveillance video; recording a motion pattern; and detecting a "multi-grabbing" event by analyzing the motion pattern. A method for implementing such an embodiment may comprise performing on input video at least one of the operations selected from the group consisting of motion detection and change detection; recording a motion pattern based on a result of said at least one of the operations; and analyzing the motion pattern to detect periodic motion in the video. For example, an input video frame may first be processed by a change detector, a motion detector, or a combination of a change detector and a motion detector; the output of which may include one or more foreground masks A foreground mask may contain two values for the various pixels, foreground and non-foreground. Here, "foreground" represents meaningful changes over time. Motion block masks may be generated using the foreground masks. Then, based on a history of each motion block, the motion block information may be stored in an array, where the motion block information may include x and y coordinates of the motion block, as well as a current time stamp. Periodic motion event detection may be performed based on the motion block array, as well as on user-defined rules, which may include, but which are not limited to, such rules as area of interest, time window, and/or a minimum number of incidences of a periodic motion.

Detection of a basket of merchandise leaving a store without the shopper(s) paying. Exemplary applicable rules are discussed, for example, in U.S. Published Patent Application No. 2006/0239506, identified above.

Detection of a person, e.g., employee(s), moving merchandise out of the store through an irregular channel: Person leaves box of merchandise in the area outside emergency exit.

Detection of an unscheduled delivery in a loading dock area: Non-delivery truck appears in a loading dock area.

Detection of an unscheduled and/or unauthorized activity in a store area, e.g., behind a counter, in a pharmacy, a store room, or a warehouse: Person appears in an unauthorized area after hours.

Detection of a person(s) reaching into a cash register drawer: Person reaches across desk into a cash drawer. Exemplary applicable rules are further discussed, for example, in U.S. Published Patent Application No. 2006/0262958, identified above.

Detection of an employee not checking out item(s) for a customer, i.e., sweethearting: A number of items scanned by the point of sale (POS) system does not match a number of items detected by the video analytics engine.

Detection of merchandise left in/on bottom of a shopping basket or cart and not scanned: Item left in a shopping trolley after the POS transaction is complete.

POS system integration: A refund, void or no-sale transaction with no customer physically present; a manager override transaction with no manager present; and a transaction involving controlled merchandise, such as cigarettes, in which no such merchandise are rung-up on the register. Exemplary applicable rules are further discussed, for example, in U.S. Provisional Patent Application No. 60/803,191, identified above.

Examples of exemplary retail business processes involving intelligence data gathering that may be monitored by using exemplary rules may include:

Tracking people through the store areas to determine, for example:

How many people go through a particular store area: Count alerts each time person enters or exits area.

Where people dwell: Count how many times and how long people loiter in a particular area.

How long people dwell: Count length of each loiter.

How the shopping habits of the customers compare to their purchasing habits (by employing, for example, POS data). Compare loiter activity in the areas of store with the items purchased.

The behavior of a shopping unit: How many people come in together as a group; where the group travels in a store; and what the group buys.

Queue length monitoring: How many people are in the checkout line. Exemplary applicable rules are further discussed, for example, in U.S. Published Patent Application No. 2006/0291695, identified above.

Monitoring of store cleanliness: Monitor a store for spills, fallen merchandise or displays.

Monitoring of an unattended delivery: If the delivery people are not there at the right time, or move to the unauthorized areas of the store.

Measuring employee effectiveness through object tracking and POS data: Compare time employee spent with a customer and whether the customer purchased product.

Measuring customer service process through people tracking by monitoring employee-customer interactions: measure time a customer service employee spends with a customer.

Measuring store layout effectiveness through people tracking and marketing and/or conversion data: Compare loitering to marketing display locations.

FIGS. 2A to 2J illustrate images from monitoring exemplary retail business processes using exemplary automated video surveillance systems employing exemplary rules.

Figure 2A:
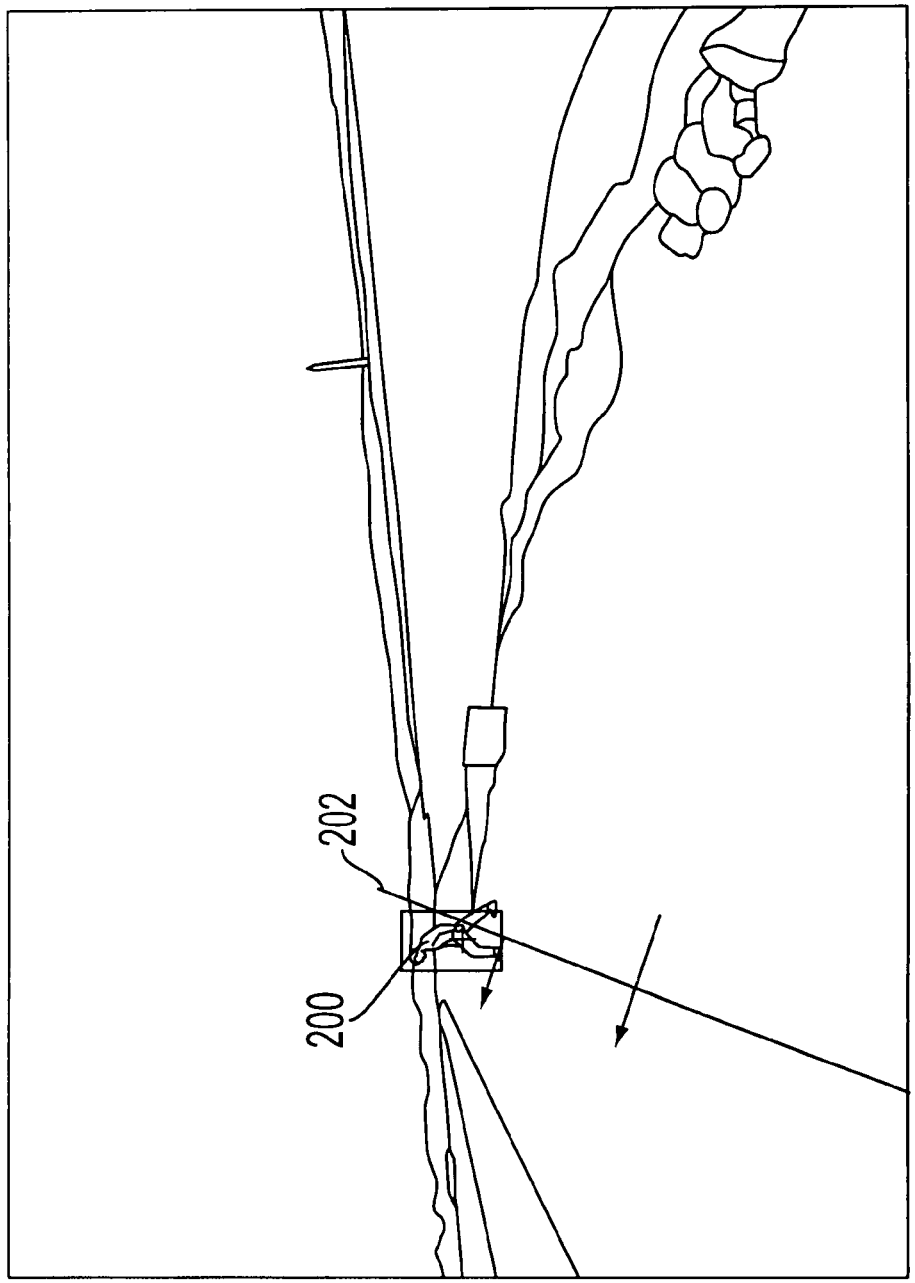

FIG. 2A depicts a physical security example. Here, the system is detecting an intruder 200 who crosses a virtual security perimeter using, for example, a tripwire 202.

Figure 2B:
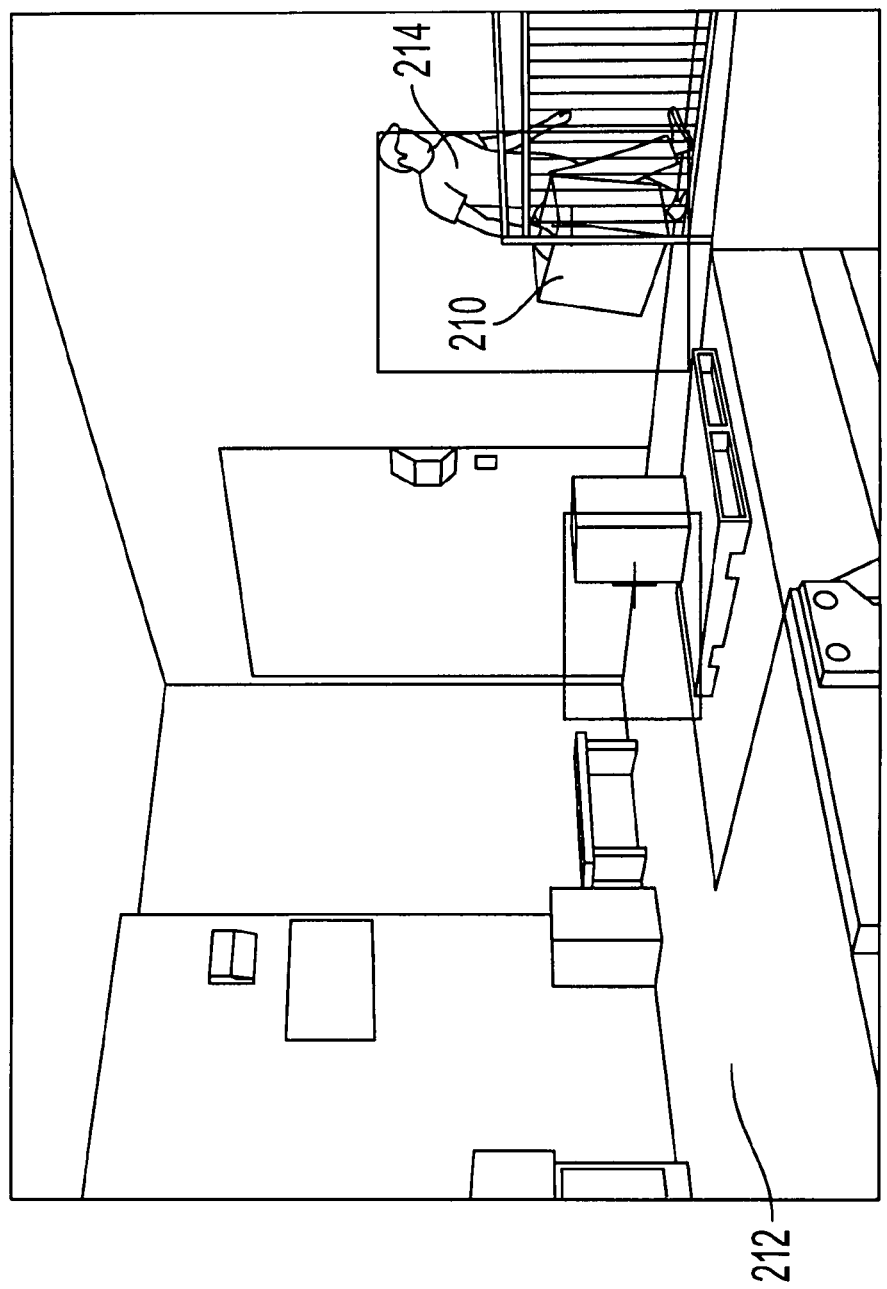

FIG. 2B depicts a theft of goods 210 from a loading dock 212 by a person 214 detected in the video.

Figure 2C:
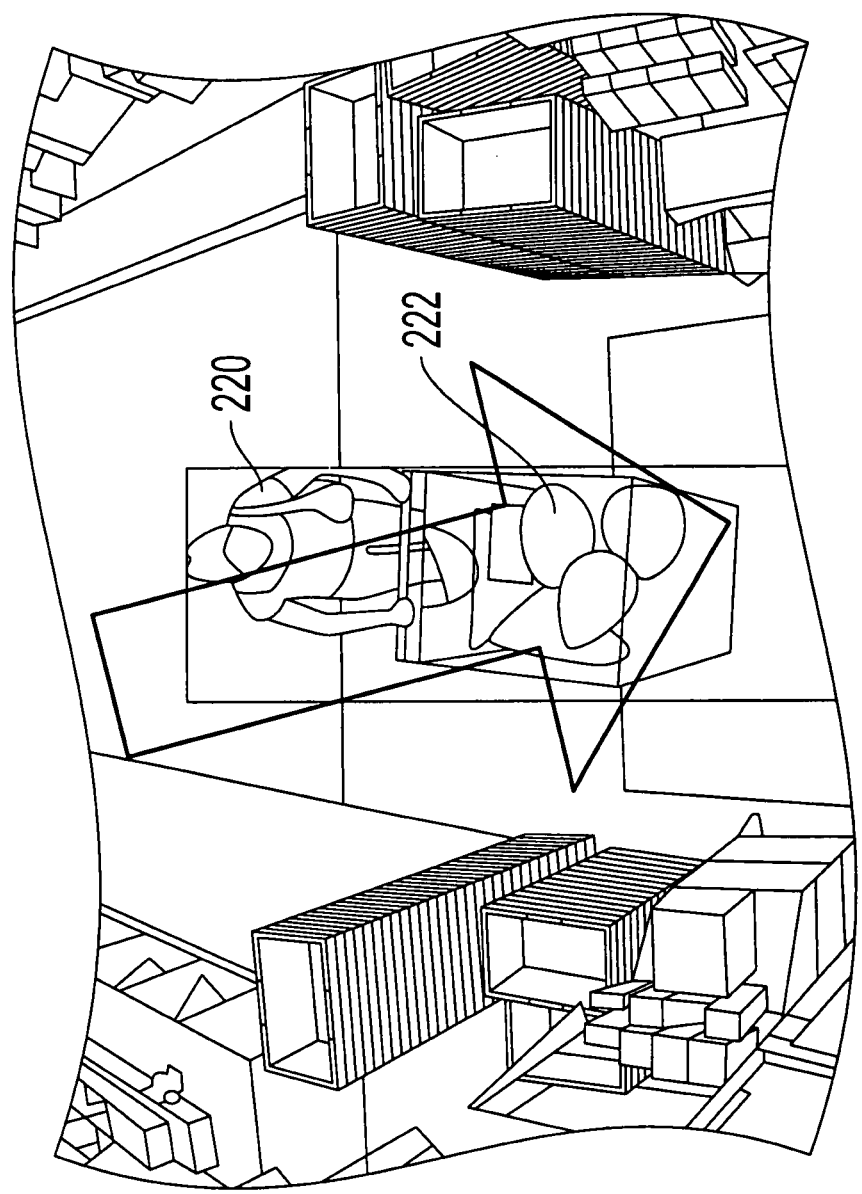

FIG. 2C depicts a person 220 being detected running a basket 222 full of goods through the exit of a store without having paid for them, i.e., she has not been detected to come from the cash registers.

Figure 2D:
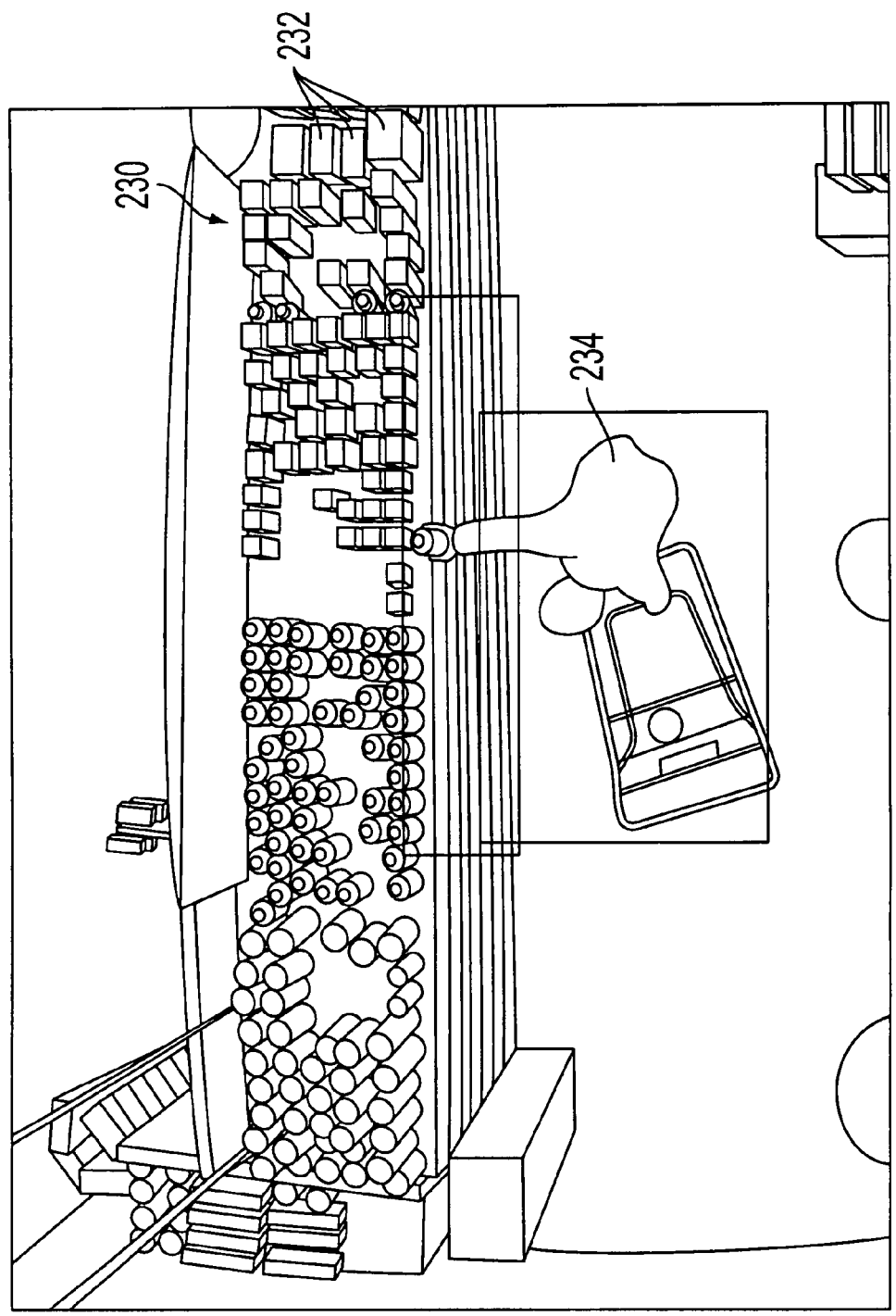

FIG. 2D depicts an example of an application to monitor a shelf 230 of high value items 232, also known as shelf clearing. Here, the system is counting the number of times a person 234 grabs an item off the shelf. For example, a store policy in such application may dictate that if more than four items are grabbed, the activity should be flagged for later investigation.

Figure 2E:
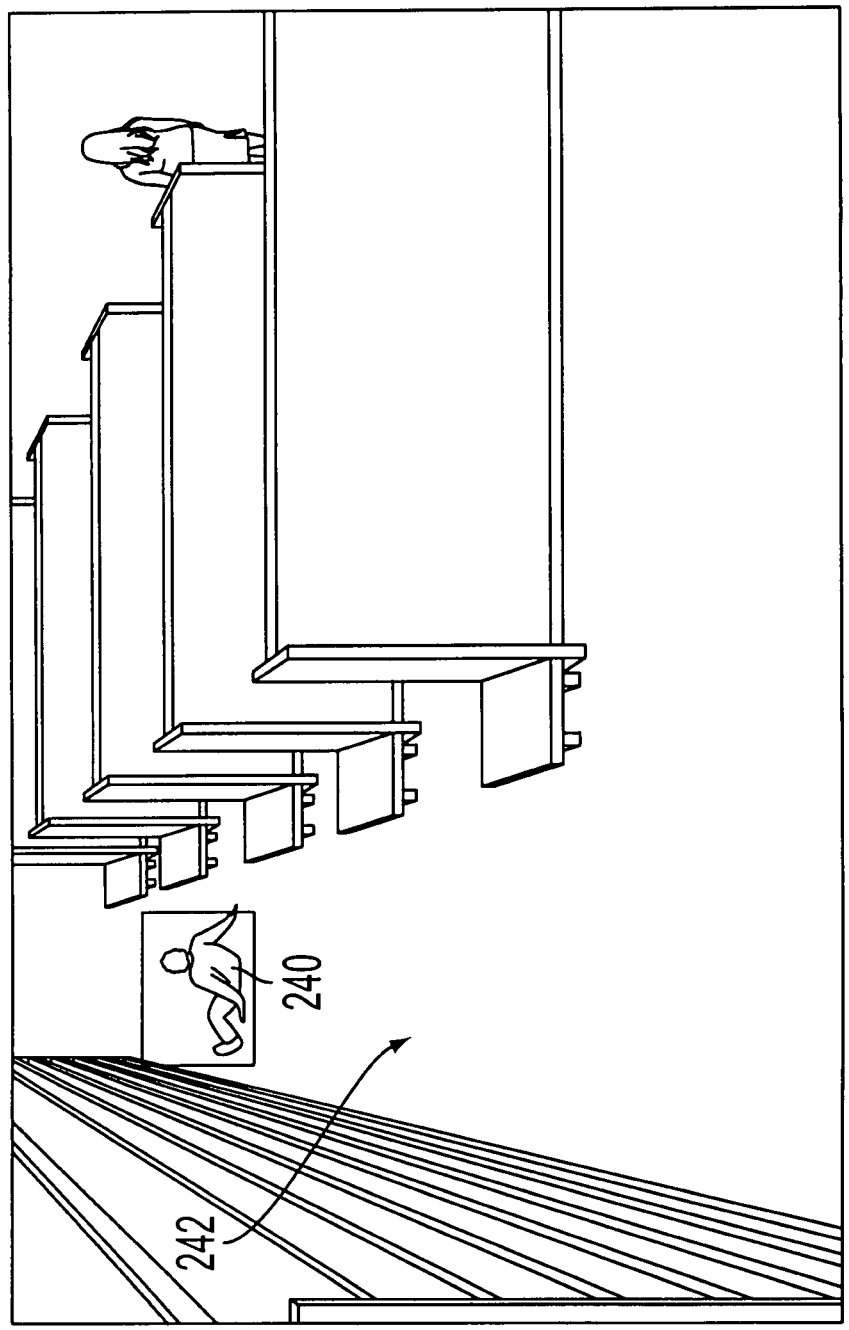

FIG. 2E depicts an example of the system detecting a slip and fall of a person 240 in an aisle 242.

Figure 2F:
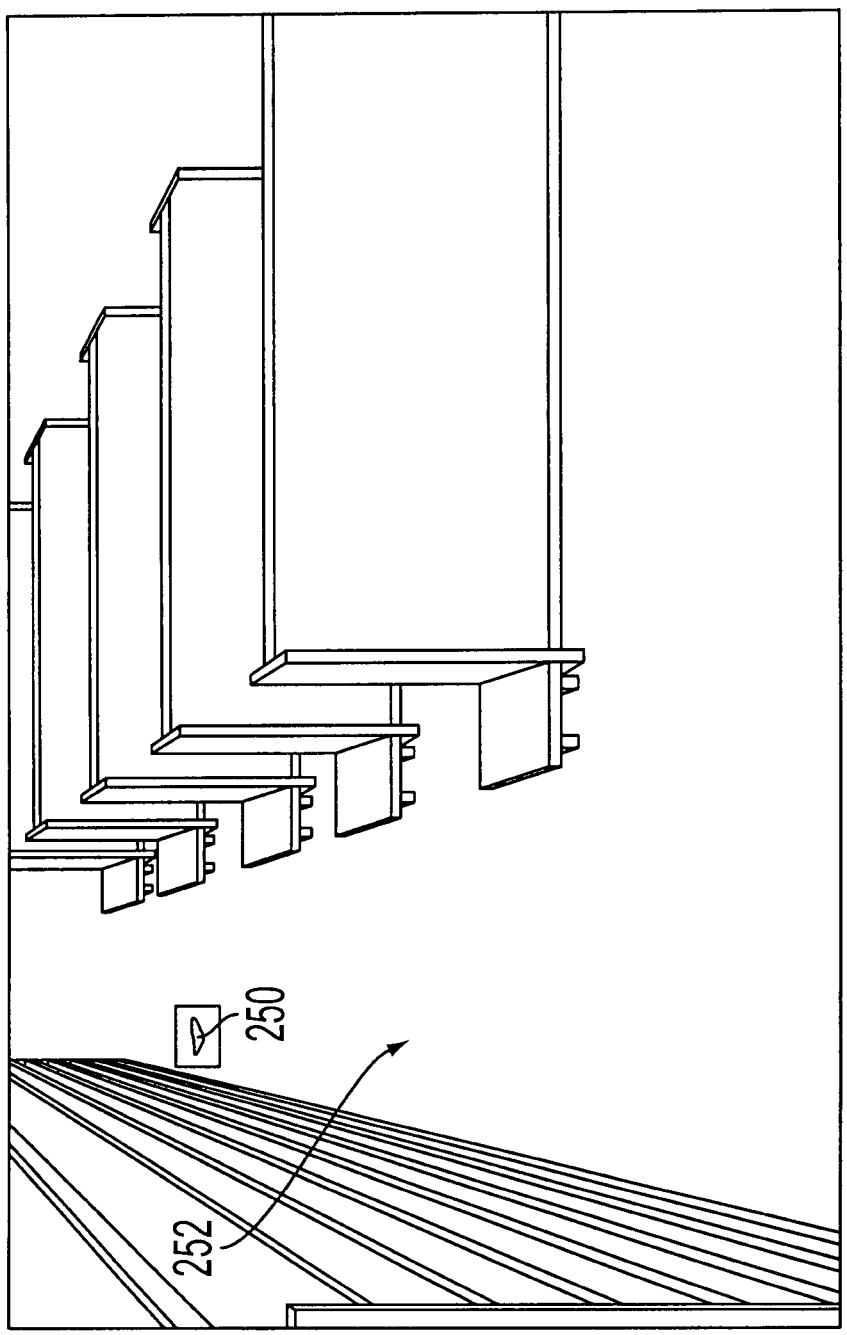

FIG. 2F depicts an example of the system detecting a spill or obstruction 250 in the aisle 252.

Figure 2G:
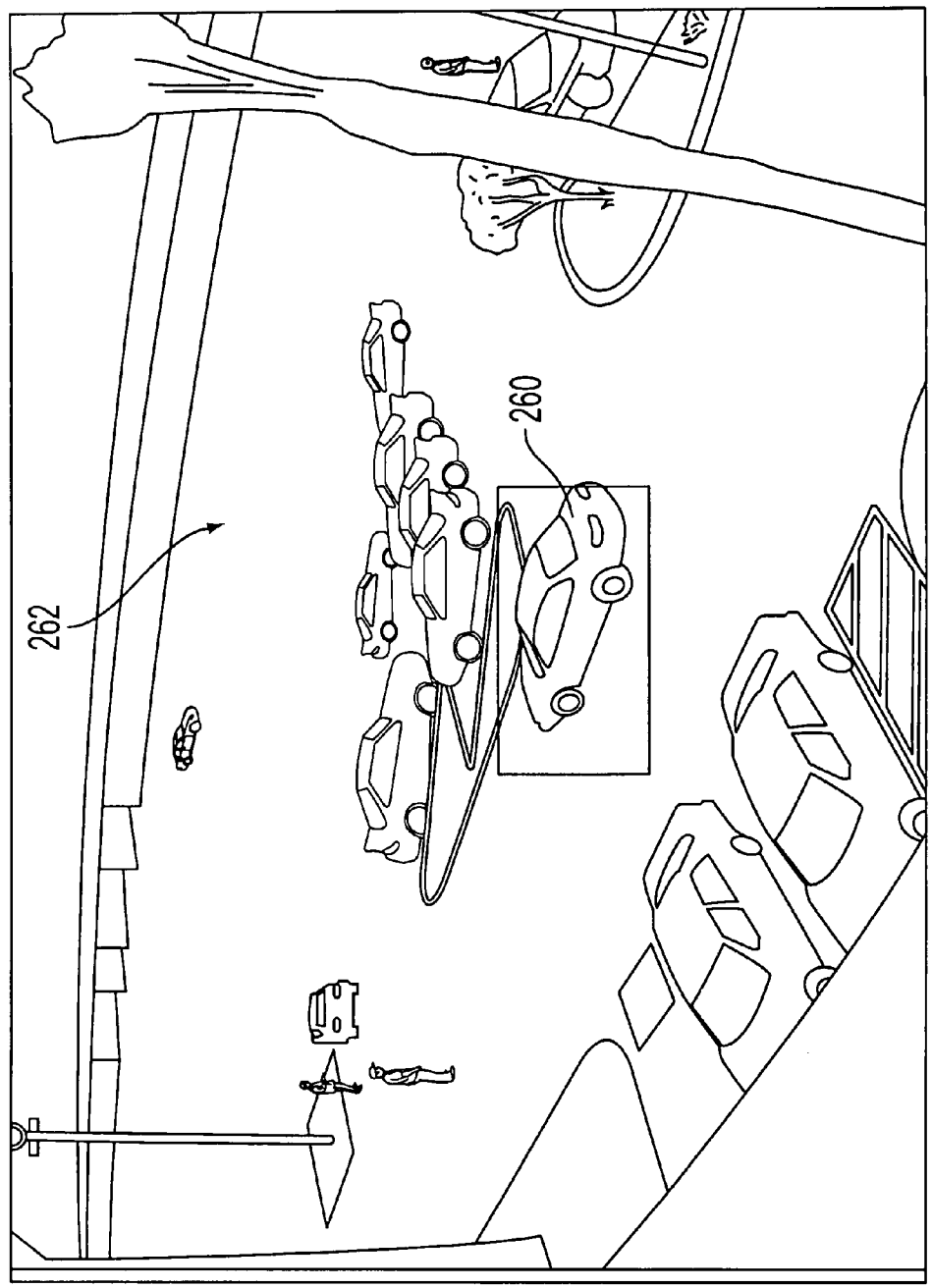

FIG. 2G depicts an example of the system detecting a car 260 moving abnormally fast in the parking lot 262.

Figure 2H:
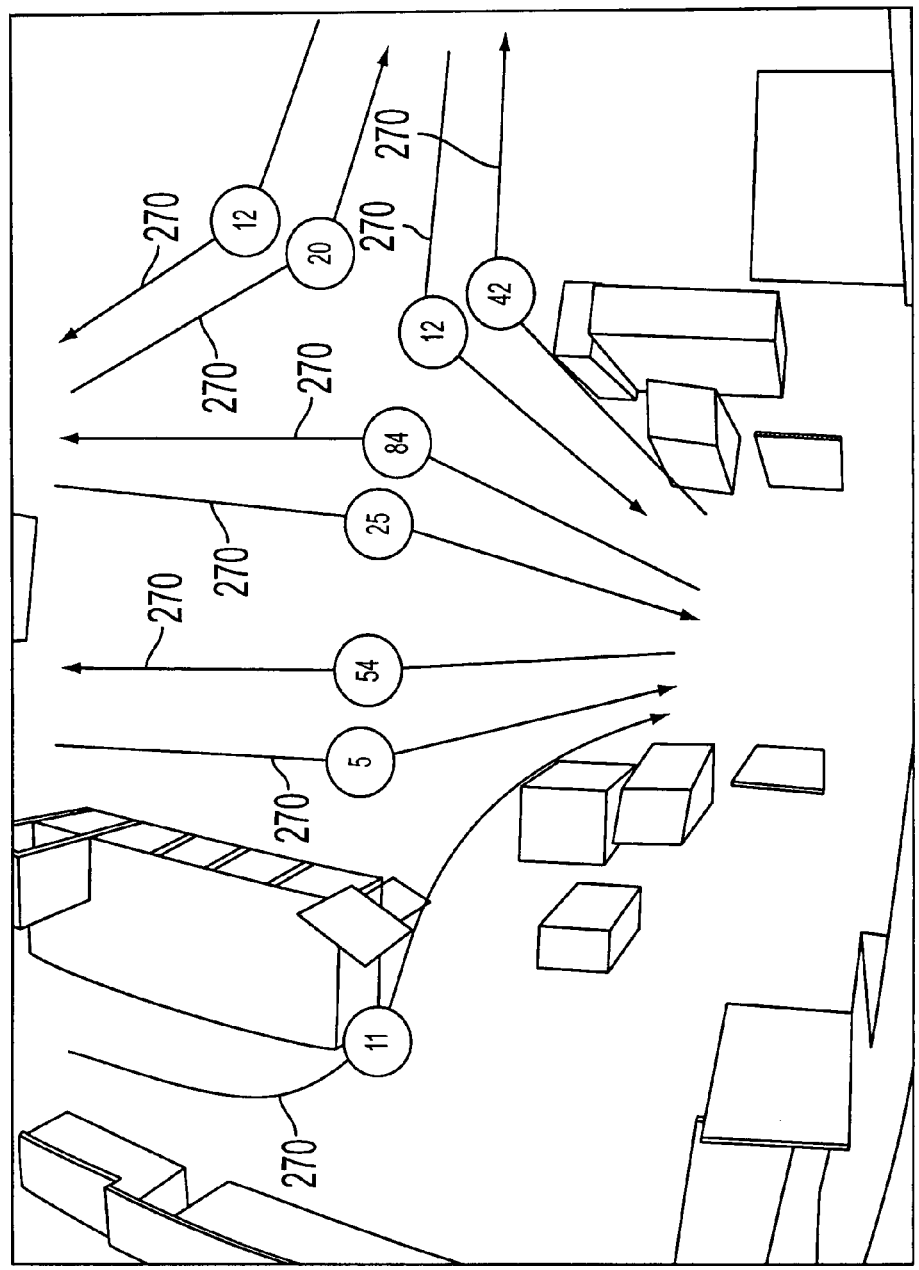
Figure 21:
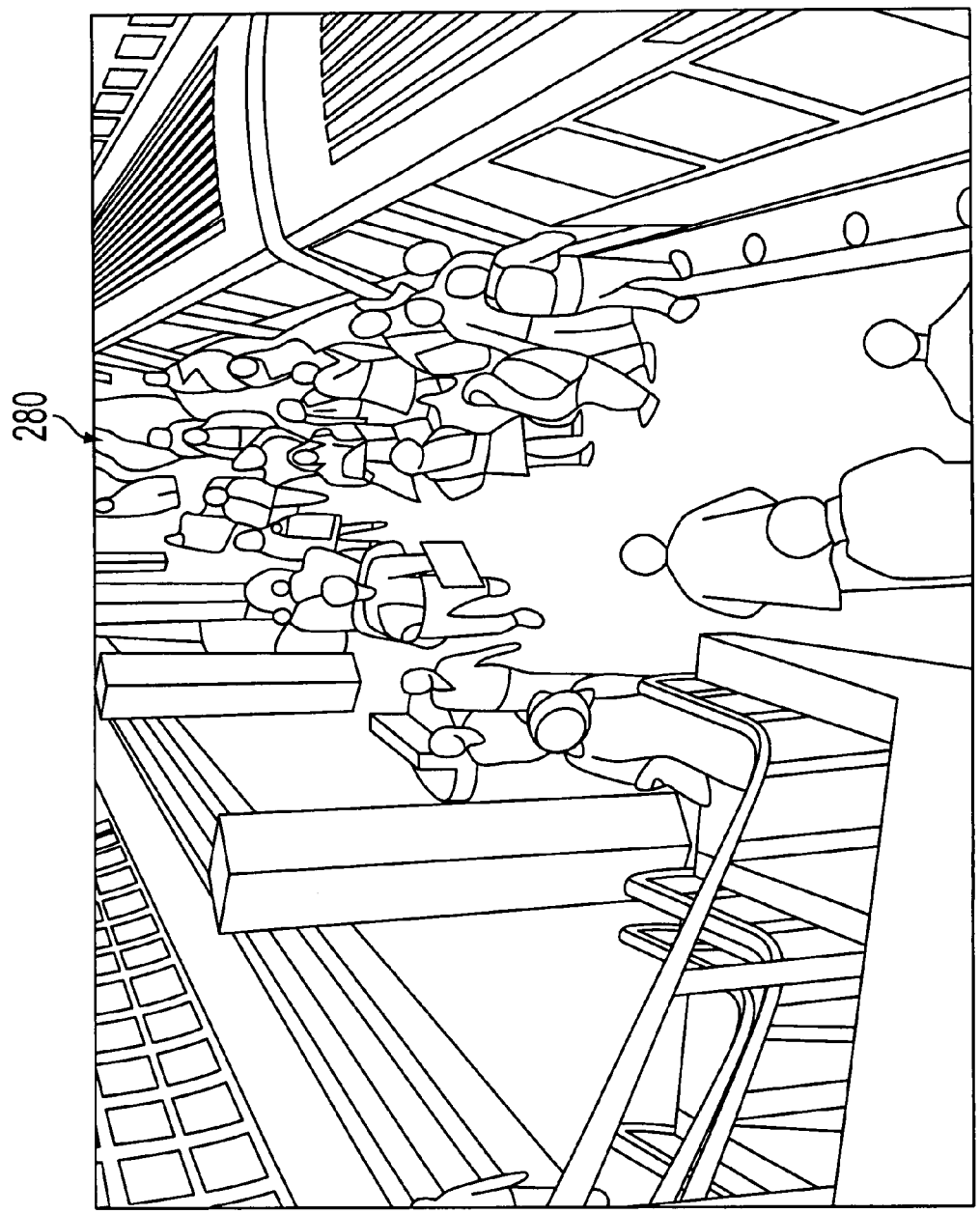

FIG. 2H depicts an example of the system generating report data that presents paths 270 of people through a store area. The number in each path represents a count of how many people followed each path. Here, nine paths are detected.

FIG. 2I depicts an example of the system detecting a high density crowd of people 280.

Figure 2J:
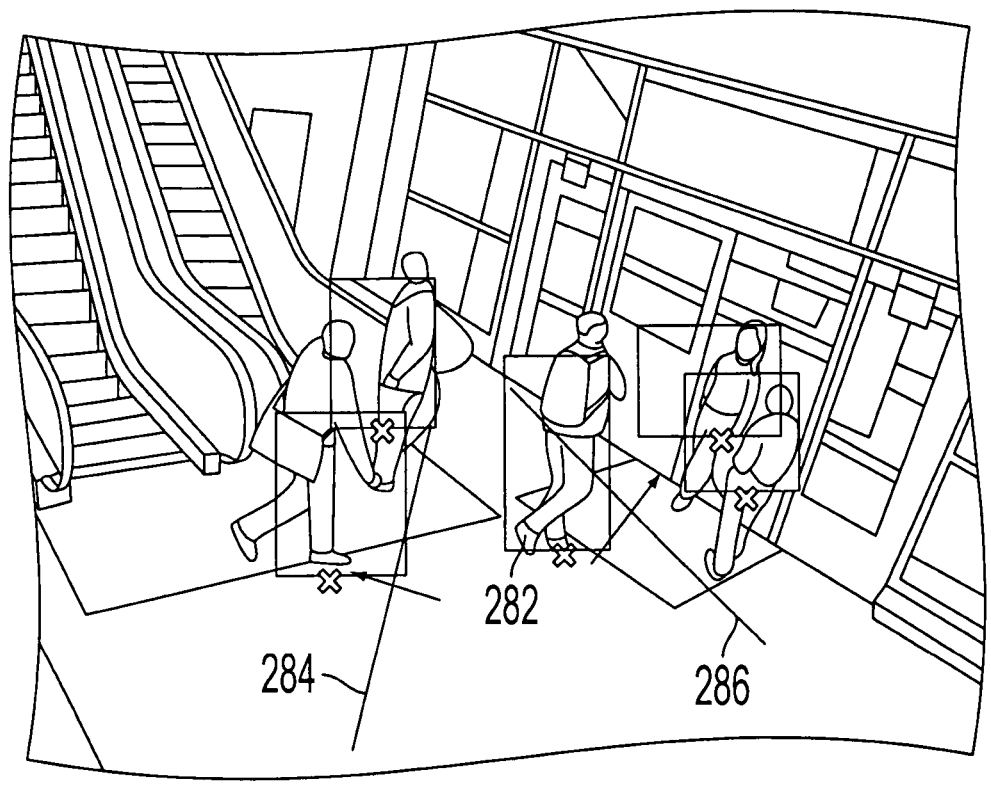

FIG. 2J depicts an example of the system counting the people 282 coming into or out of a store. Here, two directional tripwires 284, 286 are used to detect entry and exit events. The system may count the number of events from each tripwire 284, 286.

Figure 2K:
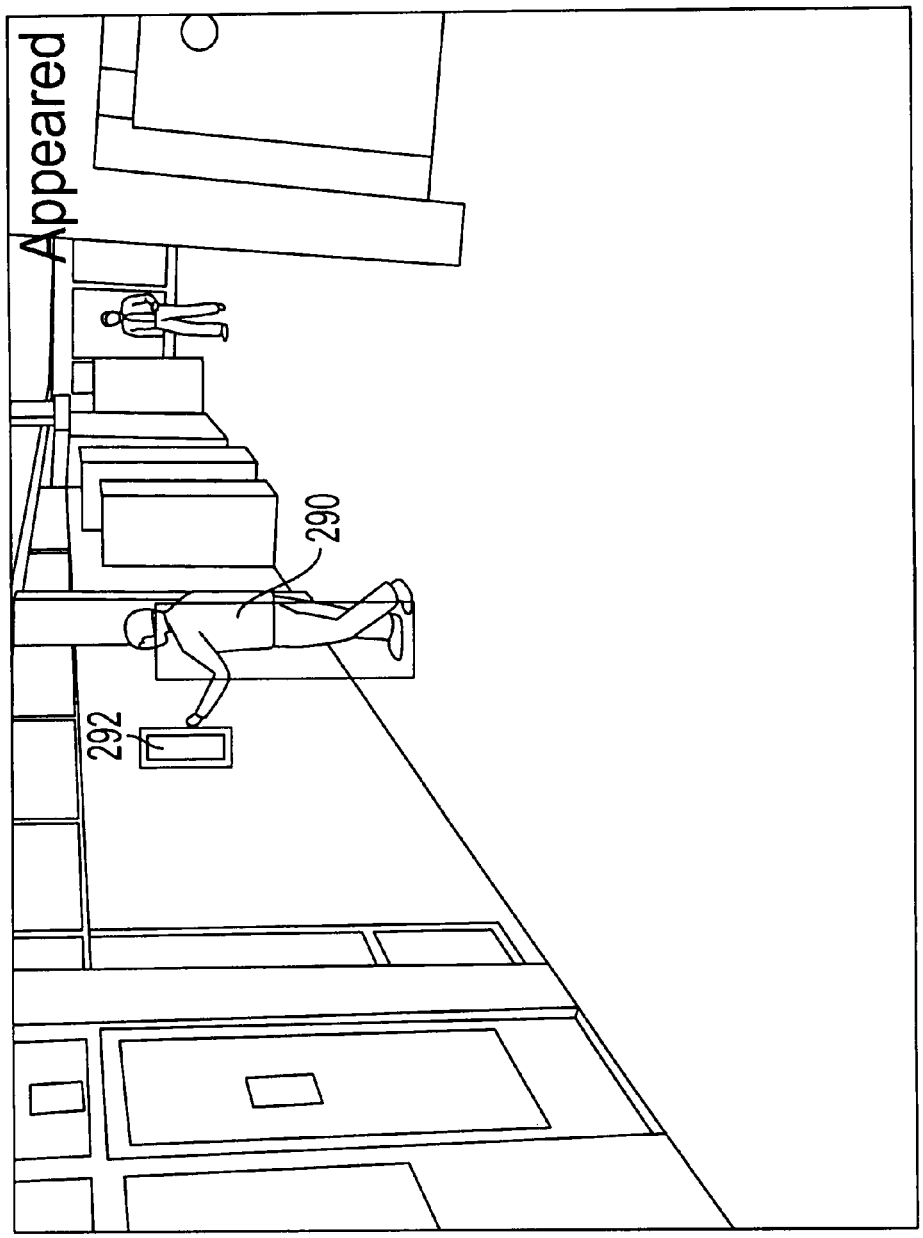

FIG. 2K depicts an example of the system detecting vandalism. Here, a person 290 is putting up a poster 292 in an unauthorized area.

With reference again to FIG. 1, the report generation engine 80 may accumulate events into a report that may provide an overview of retail business processes. For example, for the retail business process of intelligence data gathering, an exemplary report may include people counting and shopping behavior. For people counting, if it is desired to count the number of people who enter or exit a store, the report generation engine may be used to agglomerate individual entry and exit events, detected via a tripwire(s), for example, and provide a time-based histogram of consumer behavior. For shopping behavior, the automated video surveillance system may determine typical traffic flows of people passing through a store area. The report generation engine 180 may provide a report that may outline how many people travel through a particular area of a store, how many people stop in front a particular display, how long people stop, on average, and, if the POS data is available, how the POS data compare with sales of the respective product.

Figure 3A:
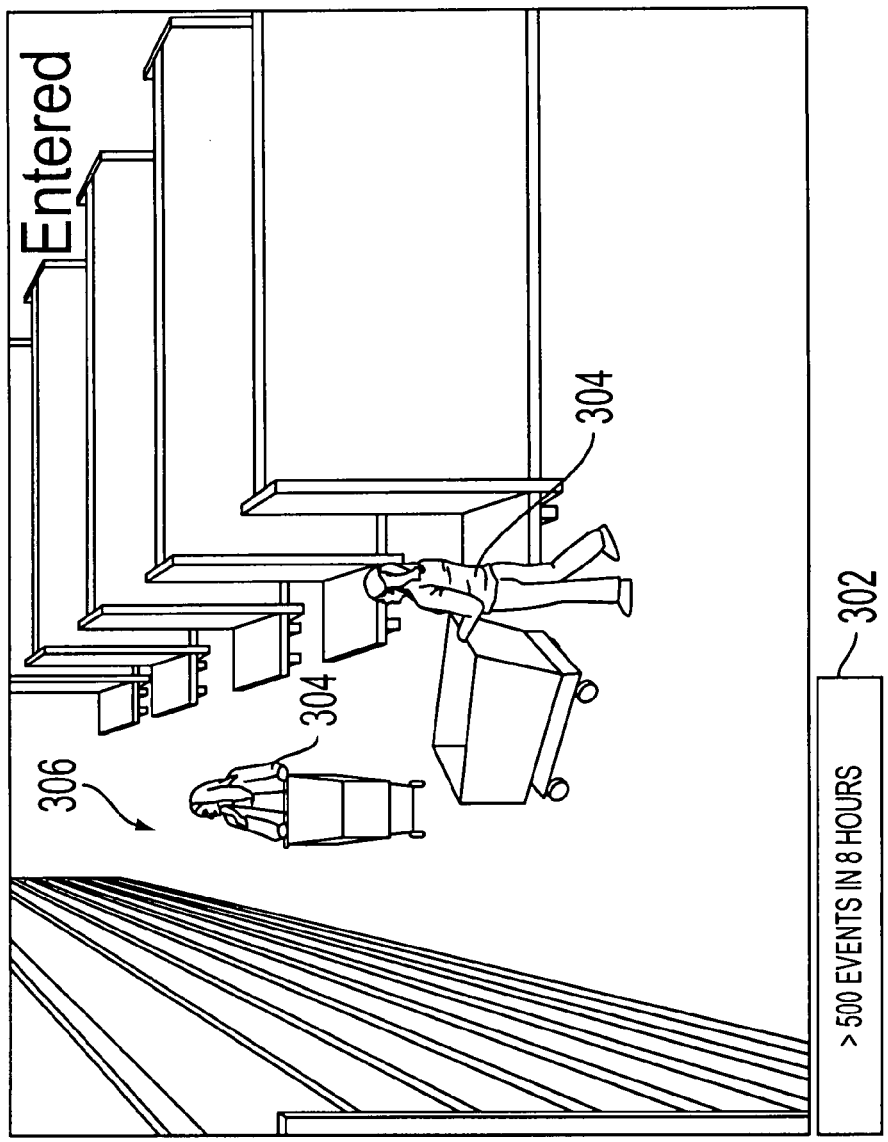
FIGS. 3A to 3D illustrate exemplary reports generated using exemplary embodiments of the invention.

FIGS. 3A-3D illustrate exemplary reports which may be generated using an exemplary embodiment of the invention. With reference to FIG. 3A, the automated video surveillance system 100 may generate a report 302 based on the rule 148 or query 150: how many people 304 enter the drug store aisle 306 during a time period, e.g., eight hours? The report 302 generated in response to the query shows that over 500 events were detected in eight hours.

Figure 3B:
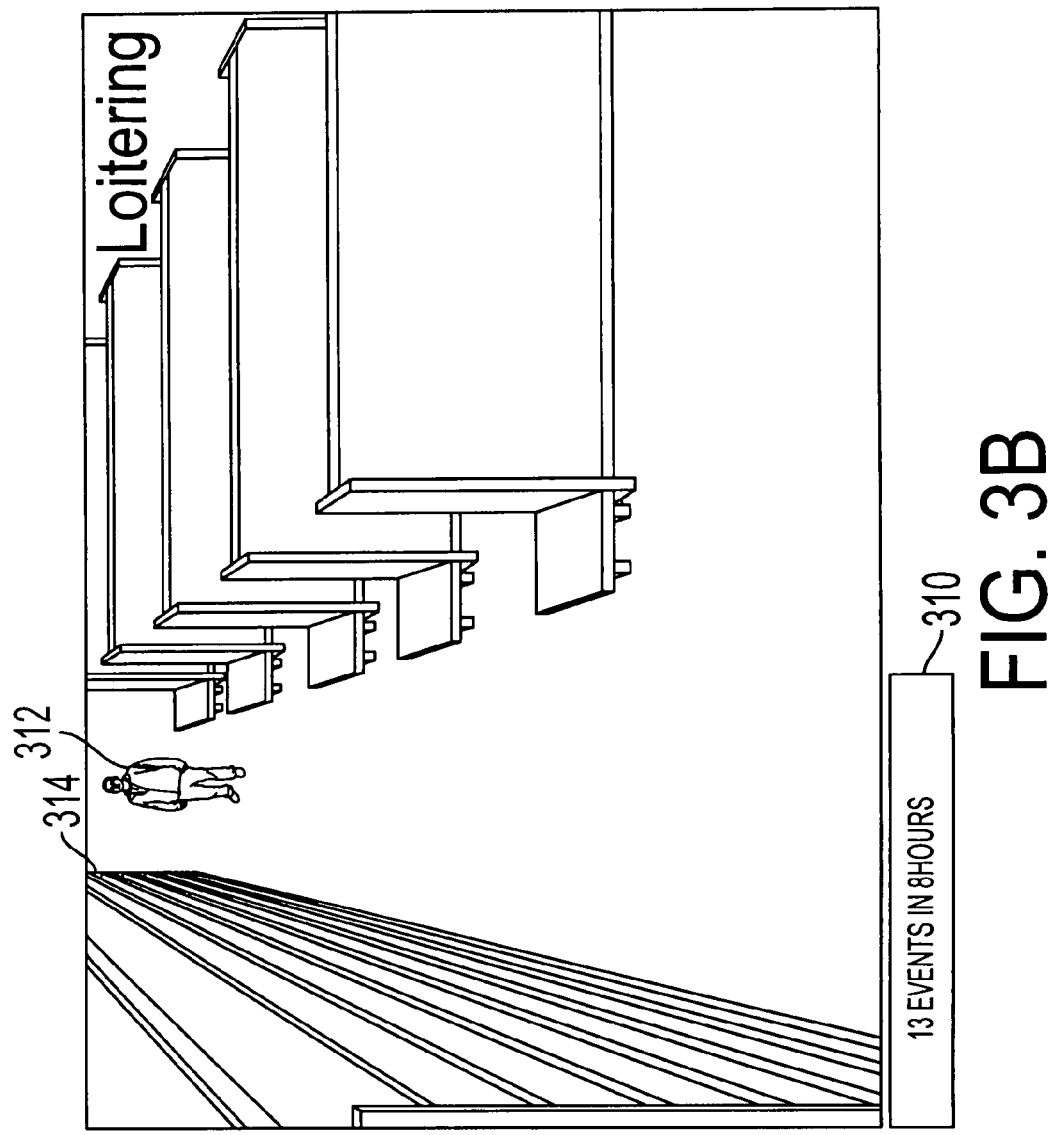

With reference to FIG. 3B, the automated video surveillance system 100 may generate a report 310 based on the rule 148 or query 150: how many people 312 loiter in front of the cosmetics 314 during the time period, e.g. eight hours? The report 310 generated in response to the query shows that 13 events were detected in eight hours.

Figure 3C:
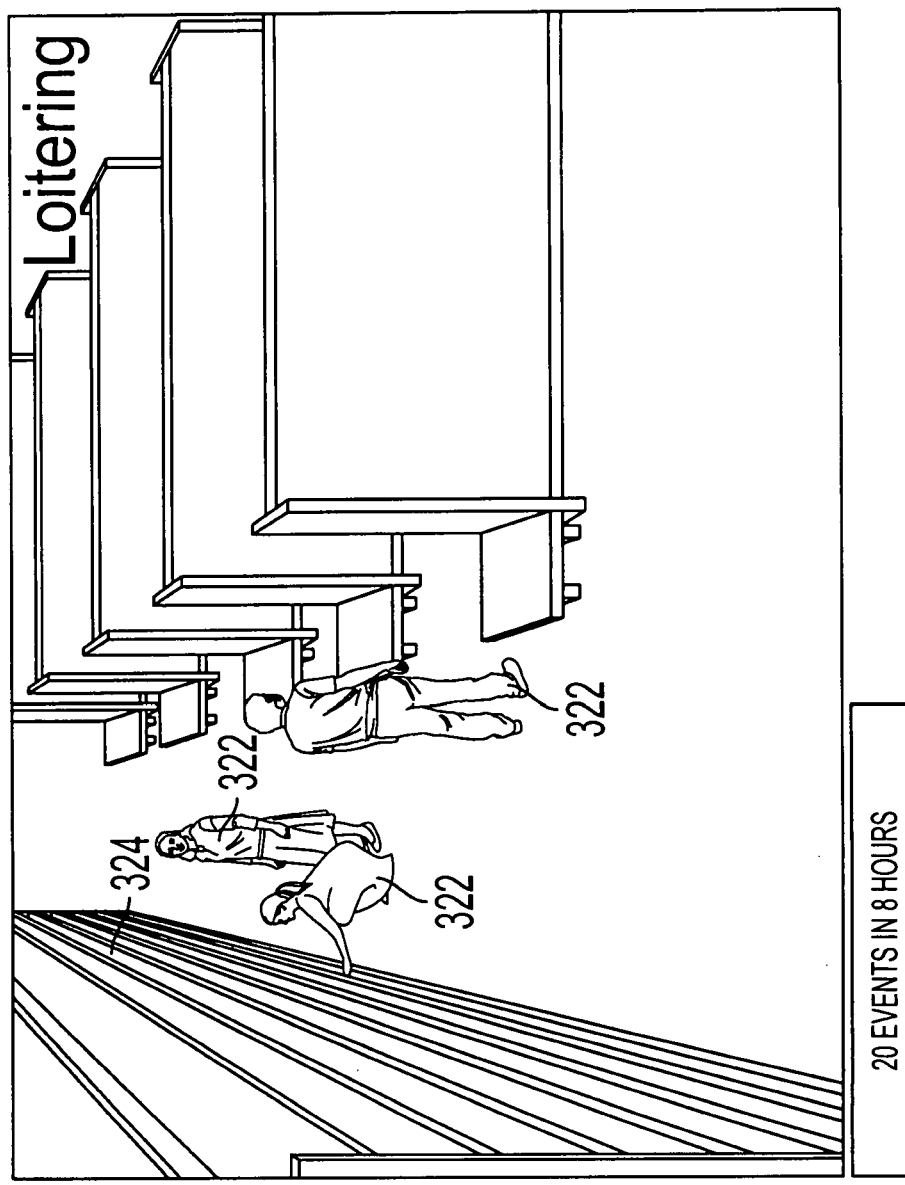

With reference to FIG. 3C, the automated video surveillance system 100 may generate a report 320 based on the rule 148 or query 150: how many people 322 loiter in front of the razor blades 324 during the time period, e.g. eight hours? The report 320 generated in response to the query shows that 20 events were detected in eight hours.

Figure 3D:
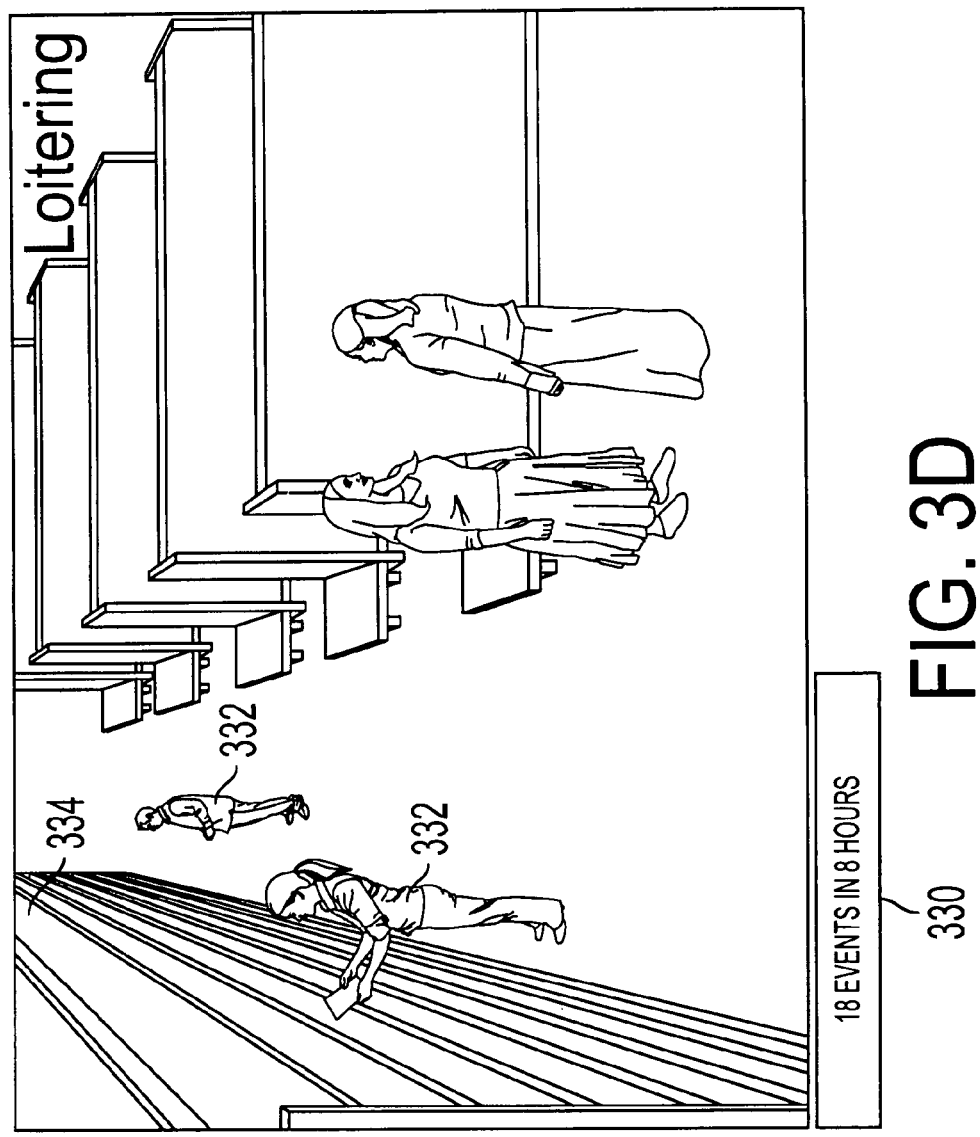

With reference to FIG. 3D, the automated video surveillance system 100 may generate a report 330 based on the rule 148 or query 150: how many people 332 loiter in front of the pharmacy 334 during the time period, e.g., eight hours? The report 330 generated in response to the query shows that 18 events were detected in eight hours.

The invention has been described in detail with respect to exemplary embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method for video monitoring a retail business process comprising:
   obtaining video from a video camera;
   processing, by one or more processors within one or more devices, the video obtained from the video camera;
   generating, by one or more processors within one or more devices, video primitives regarding the video, wherein the video primitives comprise a high-value item stealing video primitive;
   defining at least one activity of interest regarding an area being viewed, wherein an activity of interest identifies at least one of a user-defined rule or a user-defined query regarding the area being viewed, wherein at least one of the user-defined rule or the user-defined query comprises detection of high-value item stealing based on counting, using only the video, a number of times a person removes high-value items off a shelf;
   wherein the number of times the person removes the high-value items off the shelf is counted using only the video by analyzing a motion pattern in the video to detect periodic motion based on an array of motion block information;
   wherein the array of motion block information comprises motion blocks associated with a person removing high-value items off the shelf, wherein the motion blocks are generated based on one or more foreground masks and include a predetermined number of foreground pixels, wherein the predetermined number of foreground pixels is a user-defined parameter;
   processing, by one or more processors within one or more devices, the generated video primitives based on at least one defined activity of interest to determine that an activity of interest occurred in the video based on determining that the number of times the person removes the high-value items off the shelf exceeds a user-defined threshold; and
   generating an alert based on determining that the number of times the person removes the high-value items off the shelf exceeds the user-defined threshold.

2. The method of claim 1, wherein an array of motion block information associated with the person near the high-value item comprises positions and directions of motion blocks associated with the person near the high-value item.

3. A non-transitory computer-readable medium comprising software for video monitoring a retail business process, which software, when executed by a computer system, causes the computer system to perform operations comprising a method of:
   processing video obtained by a video camera;
   generating video primitives regarding the video, wherein the video primitives comprise a high-value item stealing video primitive;
   defining at least one activity of interest regarding an area being viewed, wherein an activity of interest identifies at least one of a user-defined rule or a user-defined query regarding the area being viewed, wherein at least one of the user-defined rule or the user-defined query comprises detection of high-value item stealing based on counting, using only the video, a number of times a person removes high-value items off a shelf;
   wherein the number of times the person removes the high-value items off the shelf is counted using only the video by analyzing a motion pattern in the video to detect periodic motion based on an array of motion block information;
   wherein the array of motion block information comprises motion blocks associated with a person removing high-value items off the shelf, wherein the motion blocks are generated based on one or more foreground masks and include a predetermined number of foreground pixels, wherein the predetermined number of foreground pixels is a user-defined parameter;
   processing the generated video primitives based on at least one defined activity of interest to determine that an activity of interest occurred in the video based on determining that the number of times the person removes the high-value items off the shelf exceeds a user-defined threshold; and
   generating an alert based on determining that the number of times the person removes the high-value items off the shelf exceeds the user-defined threshold.

4. The non-transitory computer-readable medium of claim 3, wherein the array of motion block information associated with the person near the high-value item comprises at least one of up directions or down directions of motion blocks associated with the person near the high-value item.

5. An apparatus for video monitoring a retail business process comprising:
   a video camera configured to obtain video of an area;
   a video analytics engine configured to process the obtained video and generate video primitives regarding the video, wherein the video primitives comprise a high-value item stealing video primitive; and
   an activity inference engine configured to process the generated video primitives based on at least one activity of interest regarding an area being viewed to determine if an activity of interest occurred in the video, wherein an activity of interest defines at least one of a rule or a query selectively identified by a user regarding the area being viewed, wherein at least one of the rule or the query comprises detection of high-value item stealing based on counting, using only the video, a number of times a person removes high-value items off a shelf, wherein the number of times the person removes the high-value items off the shelf is counted using only the video by analyzing a motion pattern in the video to detect periodic motion based on an array of motion block information; wherein the array of motion block information comprises motion blocks associated with the person removing the high-value items off the shelf, wherein the motion blocks are generated based on one or more foreground masks and include a predetermined number of foreground pixels, wherein the predetermined number of foreground pixels is a user-defined parameter; and
   an alert interface engine coupled to the activity inference engine configured to generate an alert based on determining that the number of times the person removes the high-value items off the shelf exceeds a user-defined threshold.

6. The apparatus as in claim 5, wherein the video analytics engine is resident within one of a chip, a chip set, or chips.

7. The apparatus as in claim 5, wherein the video analytics engine and the activity inference engine are resident within one of a chip, a chip set, or chips.

8. The apparatus as in claim 5, further including:
   a plurality of video cameras which at least one obtains video of an associated area, wherein the video analytics engine processes the obtained video of at least one area and generates video primitives regarding the video and wherein the activity inference engine processes the generated video primitives based on at least one activity of interest regarding at least one area being viewed to determine if an activity of interest occurred in an associated video.

9. A system for video monitoring a retail business process comprising:
one or more processors within one or more devices configured to execute:
a video analytics engine configured to process video obtained by a video camera and to generate video primitives regarding the video, wherein the video primitives comprise a high-value item stealing video primitive;
a user interface configured to define at least one activity of interest regarding an area being viewed, wherein an activity of interest identifies at least one of a user-defined rule or a user-defined query regarding the area being viewed, wherein at least one of the user-defined rule or the user-defined query comprises detection of high-value item stealing based on counting, using only the video, a number of times a person removes high-value items off a shelf, wherein the number of times the person removes the high-value items off the shelf is counted using only the video by analyzing a motion pattern in the video to detect periodic motion based on an array of motion block information;
wherein the array of motion block information comprises motion blocks associated with the person removing the high-value items off the shelf, wherein the motion blocks are generated based on one or more foreground masks and include a predetermined number of foreground pixels, wherein the predetermined number of foreground pixels is a user-defined parameter;
an activity inference engine configured to process the generated video primitives based on at least one defined activity of interest and determine that an activity of interest occurred in the video based on determining that the number of times the person removes the high-value items off the shelf exceeds a user-defined threshold; and
an alert interface engine coupled to the activity inference engine configured to generate an alert based on determining that the number of times the person removes the high-value items off the shelf exceeds the user-defined threshold.

10. The system as in claim 9, wherein the video analytics engine and the activity inference engine are resident within a single device.

11. The system as in claim 9, wherein the video analytics engine and the activity inference engine are resident within the video camera.

12. The system as in claim 9, wherein the video analytics engine and the activity inference engine are resident within separate devices.

13. The system as in claim 9, wherein the video analytics engine operates in one of a real-time mode or an off-line mode.

14. The system as in claim 9, wherein the activity inference engine operates in one of a real-time mode or an off-line mode.

15. The system as in claim 9, wherein at least one defined activity of interest comprises at least one rule element and at least one combinator.

16. The system as in claim 9, further comprising:
a report generation engine coupled to the alert interface engine to generate a report based on one or more alerts received from the alert interface engine.

17. The system of claim 9, wherein the array of motion block information comprises x and y coordinates of one or more motion blocks and one or more timestamps.

* * * * *